(12) United States Patent
Banister et al.

(10) Patent No.: US 10,812,567 B2
(45) Date of Patent: *Oct. 20, 2020

(54) MULTI-THREADED DOWNLOAD WITH ASYNCHRONOUS WRITING

(71) Applicant: SESAME SOFTWARE, Santa Clara, CA (US)

(72) Inventors: Richard Banister, Escondido, CA (US); William Dubberley, Pulaski, TN (US)

(*) Notice: Subject to any disclaimer, the term of this patent is extended or adjusted under 35 U.S.C. 154(b) by 0 days.

This patent is subject to a terminal disclaimer.

(21) Appl. No.: 16/011,604

(22) Filed: Jun. 18, 2018

(65) Prior Publication Data

US 2020/0045098 A1    Feb. 6, 2020

Related U.S. Application Data

(63) Continuation of application No. 15/154,968, filed on May 14, 2016, now Pat. No. 10,003,634.

(51) Int. Cl.
| | | |
|---|---|---|
| *G06F 15/16* | (2006.01) | |
| *H04L 29/08* | (2006.01) | |
| *G06F 16/22* | (2019.01) | |

(52) U.S. Cl.
CPC .......... *H04L 67/06* (2013.01); *G06F 16/2237* (2019.01)

(58) Field of Classification Search
CPC .............................. H04L 67/06; G06F 16/2237
USPC ......................................................... 709/219
See application file for complete search history.

(56) References Cited

U.S. PATENT DOCUMENTS

| | | |
|---|---|---|
| 5,806,067 A | 9/1998 | Connor |
| 6,073,131 A | 6/2000 | Roberti |
| 7,917,512 B2 | 3/2011 | Bhide |
| 8,352,490 B2 | 1/2013 | Hansen |
| 8,548,945 B2 | 10/2013 | Dwyer et al. |
| 8,819,335 B1 | 8/2014 | Salessi et al. |
| 8,954,401 B2 | 2/2015 | Zhang et al. |
| 9,372,908 B2 | 6/2016 | Benhase et al. |
| 2006/0190947 A1 | 8/2006 | Ghosh |
| 2007/0028056 A1* | 2/2007 | Harris ..................... G06F 9/467 711/150 |
| 2007/0106666 A1 | 5/2007 | Beckerle |
| 2007/0106845 A1* | 5/2007 | Chu ..................... G06F 12/0875 711/132 |

(Continued)

*Primary Examiner* — Frantz B Jean
(74) *Attorney, Agent, or Firm* — Patrick Reilly

(57) ABSTRACT

A system and method are presented for the facilitation of threaded download of software record identifiers and software records. Software record identifiers and software records are stored in separate one-dimensional stacks, which stacks feed a plurality of download threads in a first-in, first-out method. Software records and/or software record identifiers may optionally be written in parallel, or in an asynchronous manner. The total number of threads allowed to a user may optionally be limited to a pre-set number. The speed and efficiency of downloading records is increased through use of all of the cores of multi-cored computing systems to substantively concurrently download several threads. The method further allows a failed download thread to restart from the point at which it failed, rather than beginning again from the origin of the thread, thus ensuring that no software records are duplicated, and that no software records are skipped within a download thread.

22 Claims, 12 Drawing Sheets

NETWORK 100

(56) References Cited

U.S. PATENT DOCUMENTS

| | | |
|---|---|---|
| 2008/0184232 A1 | 7/2008 | Clark |
| 2009/0150336 A1 | 6/2009 | Basu |
| 2012/0254137 A1* | 10/2012 | Rozenwald ......... G06F 16/2471 |
| | | 707/700 |
| 2015/0373080 A1* | 12/2015 | Min ........................ H04L 67/02 |
| | | 709/203 |
| 2016/0232188 A1 | 8/2016 | Konik et al. |

* cited by examiner

FIGURE 7G

| STACK2.001 | | | | |
|---|---|---|---|---|
| STACK2.ID.001 | | | | |
| RW.001 | REC.ID.001 | REC.ID.002 | REC.ID.003 | REC.ID.004 | REC.ID.005 |
| RW.002 | REC.ID.006 | REC.ID.007 | REC.ID.008 | REC.ID.009 | REC.ID.N |

FIGURE 7H

| STACK2.N | | | | |
|---|---|---|---|---|
| STACK2.ID.N | | | | |
| RW.003 | REC.ID.379 | REC.ID.380 | REC.ID.381 | REC.ID.382 | REC.ID.383 |
| RW.N | REC.ID.384 | REC.ID.385 | REC.ID.386 | REC.ID.387 | REC.N |

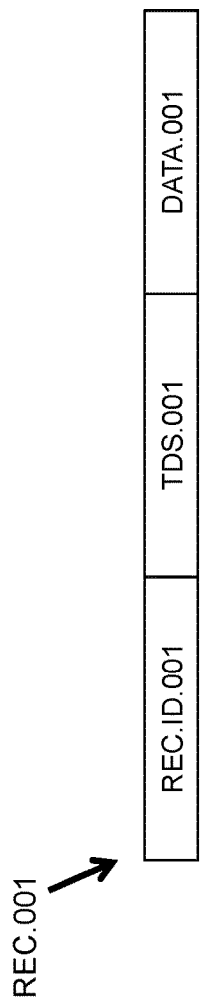

| MSG.ID.001 | MSG.TDS.001 | SRC.ADDR | TGT.ADDR |
|---|---|---|---|
| REC.ID.001 | REC.ID.002 | REC.ID.003 | REC.ID.N |

MESSAGE: SOURCE SYSTEM TO TARGET SYSTEM

| MSG.ID.002 | MSG.TDS.002 | TGT.ADDR | SRC.ADDR |
|---|---|---|---|
| TDS BOUNDS | | | |

MESSAGE: TARGET SYSTEM TO SOURCE SYSTEM

| MSG.ID.003 | MSG.TDS.003 | SRC.ADDR | TGT.ADDR |
|---|---|---|---|
| REC.001 | REC.002 | REC.003 | REC.N |

MESSAGE: SOURCE SYSTEM TO TARGET SYSTEM

MULTI-THREADED DOWNLOAD WITH ASYNCHRONOUS WRITING

CONTINUATION APPLICATION OF REGISTERED PATENT

The present Nonprovisional Patent Application is a Continuation Application of U.S. Pat. No. 10,003,634 titled "Multi-Threaded Download with Asynchronous Writing" and filed on May 14, 2016. The present Nonprovisional Patent Application claims the priority date of U.S. Pat. No. 10,003,634. Furthermore, U.S. Pat. No. 10,003,634 is hereby incorporated into the present Nonprovisional Patent Application in its entirety and for all purposes.

FIELD OF THE INVENTION

The present invention relates to a process for the maintenance and update of digitized records. More particularly the present invention relates to a method by which records and record identifiers may be accessed in threaded downloads via an electronic communications network.

BACKGROUND OF THE INVENTION

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

The prior art enables the transfer of large amounts of data across the Internet between databases. The prior art fails, however, to provide optimal systems and methods by which the data may be transferred. Improvements on existing prior art methods for access and transfer processes for data record identifiers and data records is desirable across large sectors of user groups.

There is therefore a long-felt need to provide a method and system that provide increased efficiencies of electronic transfers of data and transfer processes of data and data records.

SUMMARY AND OBJECTS OF THE INVENTION

Towards these objects and other objects that will be made obvious in light of the present disclosure, a system and method are provided to enable the electronic transfer of software records by means of a plurality of download threads.

In a first preferred embodiment of the method of the present invention (hereinafter "the invented method"), a target computing system gains access to a plurality of software record identifiers, and writes the plurality of software record identifiers to a one-dimensional digital stack. A first plurality of record identifiers are subsequently written into a first download thread, and preferably deleted from the digital stack, upon completion of the write from the digital stack to the first download thread. A plurality of software records associated with the first plurality of software record identifiers may subsequently be accessed by means of the first thread. Additionally, the invented method may preferably include newly accessed software record identifiers being written asynchronously, while record identifiers are concurrently being written to a plurality of threads.

In a further preferred embodiment of the invented method, a target computer system accesses a plurality of software record identifiers by means of a first download thread. The plurality of software record identifiers is preferably associated with at least one software record, whereby the software record may be retrieved by means of its associated software record identifier within the download thread. The associated software records may subsequently be stored in a one-dimensional digital record stack, and may be written from the digital record stack into the memory of the target computing system.

The present invention further includes a computing system by which a plurality of software record identifiers may be accessed and means by which the plurality of software record identifiers may be stored in a one-dimensional digital stack. The computing system also preferably comprises means to write the first plurality of record identifiers into the first thread from the one-dimensional digital stack, and means by which the written first plurality of record identifiers may be deleted from the digital stack. The computing system further includes means by which the software records associated with the software record identifiers in the thread may be accessed.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE FIGURES

These, and further features of the invention, may be better understood with reference to the accompanying specification and drawings depicting the preferred embodiment, in which:

FIGS. 7A-7H are block diagrams of a first through an Nth exemplary one-dimensional record stack, first through Nth exemplary one-dimensional stack, first through Nth two-dimensional record stack, and first through Nth two-dimensional stack;

FIGS. 8A-8D are block diagrams of a first through an Nth exemplary software record;

DETAILED DESCRIPTION

Figure 1:
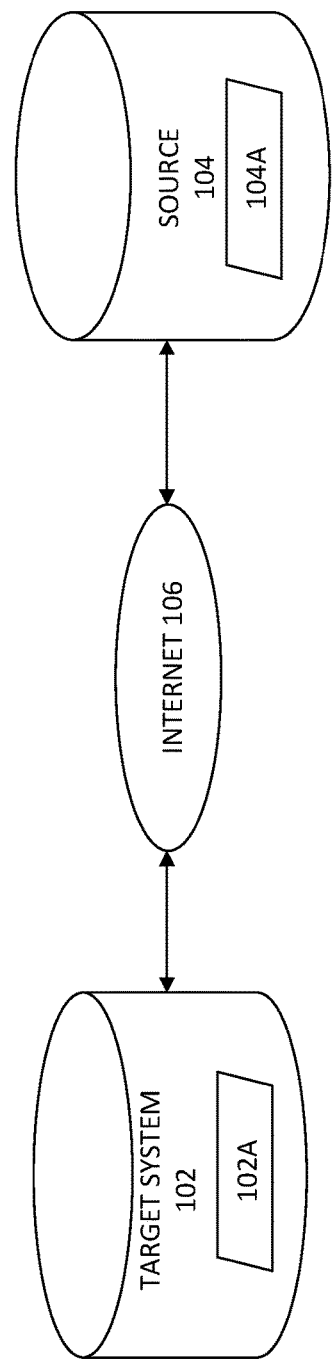
FIG. 1 is a diagram of a network, wherein the network includes a target computing system and a source computing system, bidirectionally communicatively coupled by means of one or more network coupling means known in the art, including but not limited to the Internet.

Referring now generally to the Figures, and particularly to FIG. 1, FIG. 1 is a diagram of an electronic communications network 100, wherein the electronic communications network 100 includes a target system 102 and a source system 104, bidirectionally communicatively coupled by means of one or more network coupling means known in the art, including but not limited to the Internet 106. The electronic communications network 100 bi-directionally communicatively couples, wherein the bidirectional communicative coupling may be accomplished via the Internet 106 and/or other suitable communications structures, equipment and systems known in the art. The source server 104, and the target system 102, each preferably comprise, or are bi-directionally communicatively coupled with, a separate database management system software, respectively a source DBMS 104A and a target DBMS 102A.

The source DBMS 104A and/or the target DBMS 102A may be or comprise an object oriented database management system ("OODBMS"), a relational database management system ("RDBMS") and/or an NoSQL database management system, and one or more databases, DBS 104I, and/or DBS 102I, may be or comprise an object oriented database, a relational database and/or an NoSQL database. More particularly, the target database DBMS 102A and/or the source database DBMS 104A may be or comprise one or more prior art database management systems including, but not limited to, an ORACLE DATABASE™ database management system marketed by Oracle Corporation, of Redwood City, Calif.; a Database 2™, also known as DB2™, relational database management system as marketed by IBM Corporation of Armonk, N.Y.; a Microsoft SQL Server™ relational database management system as marketed by Microsoft Corporation of Redmond, Wash.; MySQL™ as marketed by Oracle Corporation of Redwood City, Calif.; and a MONGODB™ as marketed by MongoDB, Inc. of New York City, USA; the POSTGRESQL™ open source object-relational database management system; and/or a NoSQL database.

It is understood that the scope of meaning of the term "NoSQL" as defined within the present disclosure includes a class of database management systems that do not follow all of the rules of a relational database management system and might not use traditional structured query language (hereinafter, "SQL") to query data. This type of database is generally a complementary addition to relational database management systems and SQL. Some notable implementations of NoSQL are the CASSANDRA DATABASE™, marketed by Facebook, Inc., of Menlo Park, Calif.; BIG-TABLE™ marketed by Google, Inc., of Mountain View, Calif.; and SIMPLEDB™, marketed by Amazon.com, Inc., of Seattle, Wash.

A NoSQL database does not necessarily follow the strict rules that govern transactions in relational databases. These violated rules are Atomicity, Consistency, Integrity, Durability. For example, NoSQL databases do not use fixed schema structures and SQL joins.

The source server 104 may bi-directionally communicate and transfer data with the target system 102 via the network 100 by suitable electronic communications messaging protocols and methods known in the art including, but not limited to, Simple Object Access Protocol, Representational State Transfer, and/or a web service adapted to conform with the architecture and structure of the World Wide Web.

It is understood that the source server 104 comprises a source system software program SW.SRC comprised within, hosted by and/or enabled by a bundled computer software and hardware product, such as, but not limited to, a.) a network-communications enabled THINKSTATION WORKSTATION™ notebook computer marketed by Lenovo, Inc. of Morrisville, N.C.; (b.) a NIVEUS 5200 computer workstation marketed by Penguin Computing of Fremont, Calif. and running a LINUX™ operating system or a UNIX™ operating system; (c.) a network-communications enabled personal computer configured for running WINDOWS XP™, or WINDOWS 8™ operating system marketed by Microsoft Corporation of Redmond, Wash.; or (d.) other suitable computational system or electronic communications device known in the art capable of providing or enabling a electronic communications and database management operations known in the art.

It is understood that the target system 102 also comprises a local system software program SW.TGT comprised within, hosted by and/or enabled by a bundled computer software and hardware product, such as, but not limited to, a.) a network-communications enabled THINKSTATION WORKSTATION™ notebook computer marketed by Lenovo, Inc. of Morrisville, N.C.; (b.) a NIVEUS 5200 computer workstation marketed by Penguin Computing of Fremont, Calif. and running a LINUX™ operating system or a UNIX™ operating system; (c.) a network-communications enabled personal computer configured for running WINDOWS XP™, or WINDOWS 8™ operating system marketed by Microsoft Corporation of Redmond, Wash.; or (d.) other suitable computational system or electronic communications device known in the art capable of providing or enabling a electronic communications and database management operations known in the art.

Figure 2:
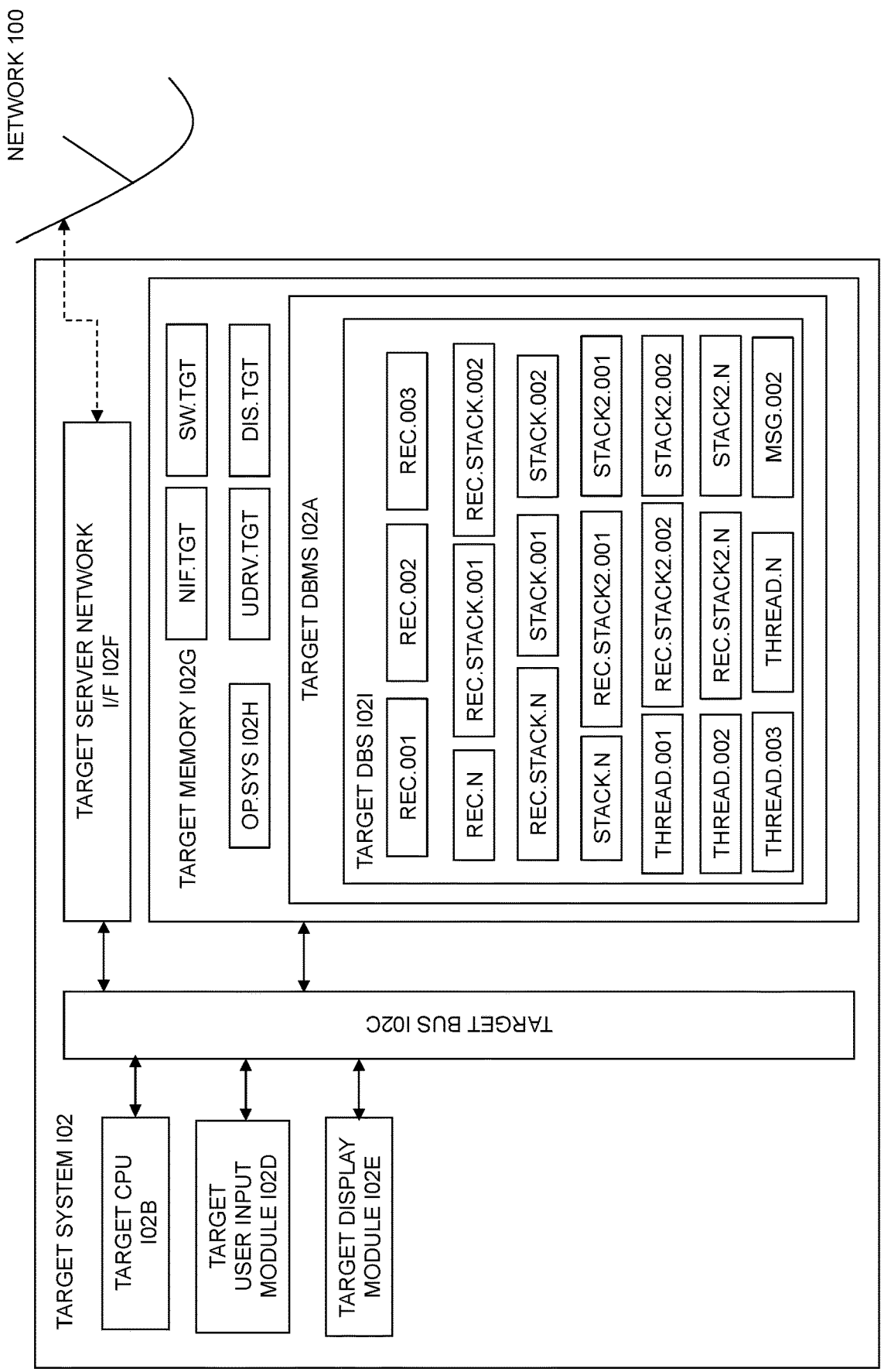
FIG. 2 is a block diagram of the target computing system.

Referring now generally to the Figures, and particularly to FIG. 2, FIG. 2 is a block diagram of the target system 102 of the electronic communications network 100 of FIG. 1, wherein the target system 102 may comprise: a central processing unit ("CPU") 102B; a user input module 102D; a display module 102E; a software bus 102C bi-directionally communicatively coupled with the CPU 102B, the user input module 102D, the display module 102E; the software bus 102C is further bi-directionally coupled with a network interface 102F, enabling communication with alternate computing devices by means of the electronic communications network 100; and a memory 102G. The target software bus 102C facilitates communications between the above-mentioned components of the target system 102.

The memory 102G of the target system 102 includes a target software operating system OP.SYS 102H. The target software OP.SYS 102H of the target system 102 may be selected from freely available, open source and/or commercially available operating system software, to include but not limited to a LINUX™ or UNIX™ or derivative operating system, such as the DEBIAN™ operating system software as provided by Software in the Public Interest, Inc. of Indianapolis, Ind.; a WINDOWS XP™, or WINDOWS 8™ operating system as marketed by Microsoft Corporation of Redmond, Wash.; or the MAC OS X operating system or iPhone G4 OS™ as marketed by Apple, Inc. of Cupertino, Calif. The target memory 102G further includes the target system software program SW.TGT, a target user input driver UDRV.TGT, a target display driver DIS.TGT, and a target network interface drive NIF.TGT. Within the target DBMS 102A hosted by the target system 102 is a target database 120I, wherein are optionally contained (a.) a plurality of exemplary software records REC.001, REC.002, REC.003, and REC.N; (b.) a plurality of exemplary one-dimensional record stacks REC.STACK.001, REC.STACK.002, and REC.STACK.N; (c.) a plurality of exemplary one-dimensional stacks STACK.001, STACK.002, and STACK.N; (d.) a plurality of exemplary two-dimensional record stacks REC.STACK2.001, REC.STACK2.002, and REC.STACK2.N; (e.) a plurality of exemplary two-dimensional stacks STACK2.001, STACK2.002, and STACK2.N; (f) a plurality of exemplary download threads THREAD.001-THREAD.N; and (g.) an exemplary second message MSG.002 to be transmitted from the target system 102 to the source system 104.

The exemplary target system software program SW.TGT is optionally adapted to enable the target system 102 to (a.) generate messages and communicate with the source server 104, (b.) process communications with and process messages received from the source server 104, and (c.) manage the target DBMS 102A to perform, execute and instantiate all elements, aspects and steps as required of the target system 102 to practice the invented method in its various preferred embodiments as particularly outlined in the methods described in FIGS. 1 and 2, and accompanying text in conjunction with one or more of the components described in FIGS. 7A through 10C, and to interact with the source server 104.

Figure 3:
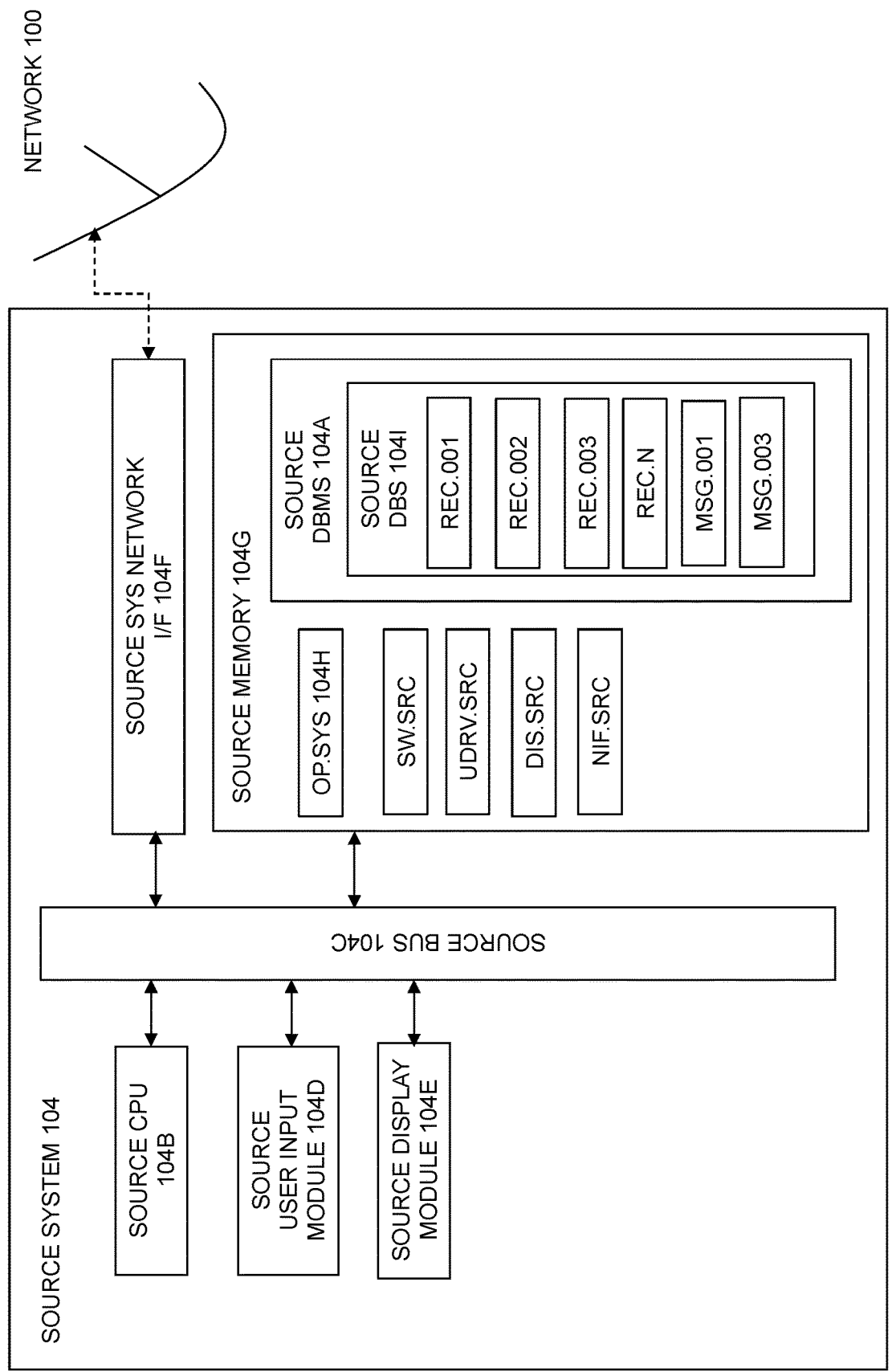
FIG. 3 is a block diagram of the source computing system.

Referring now generally to the Figures, and particularly to FIG. 3, FIG. 3 is a block diagram of the source system 104 of the electronic communications network 100 of FIG. 1, wherein the source server 104 comprises: a central processing unit ("CPU") 104B; a user input module 104D; a display module 104E; a software bus 104C bi-directionally communicatively coupled with the CPU 104B, the user input module 104D, the display module 104E; the software bus 104C is further bi-directionally coupled with a network interface 104F, enabling communication with alternate computing devices by means of the electronic communications network 100; and a source memory 104G. The source software bus 104C facilitates communications between the above-mentioned components of the source server 104.

The memory 104G of the source server 104 includes a source software operating system OP.SYS 104H. The source software OP.SYS 104H of the source server 104 may be selected from freely available, open source and/or commercially available operating system software, to include but not limited to a LINUX™ or UNIX™ or derivative operating system, such as the DEBIAN™ operating system software as provided by Software in the Public Interest, Inc. of Indianapolis, Ind.; a WINDOWS XP™, or WINDOWS 8™ operating system as marketed by Microsoft Corporation of Redmond, Wash.; or the MAC OS X operating system or iPhone G4 OS™ as marketed by Apple, Inc. of Cupertino, Calif. The source memory 104G further includes the source system software program SW.SRC, a source user input driver UDRV.SRC, a source display driver DIS.SRC, and a source network interface drive NIF.SRC. Within a source database management system 104A (hereinafter "DBMS 104A") is a source database 104I (hereinafter "source DBS 104I"). The source DBS 104I contains a plurality of software records REC.001, REC.002, REC.003, and REC.N, an exemplary first message MSG.001 to be transmitted from the source system 104 to the target system 102, and an exemplary third message MSG.003 to be transmitted from the source system 104 to the target system 102.

Figure 6:
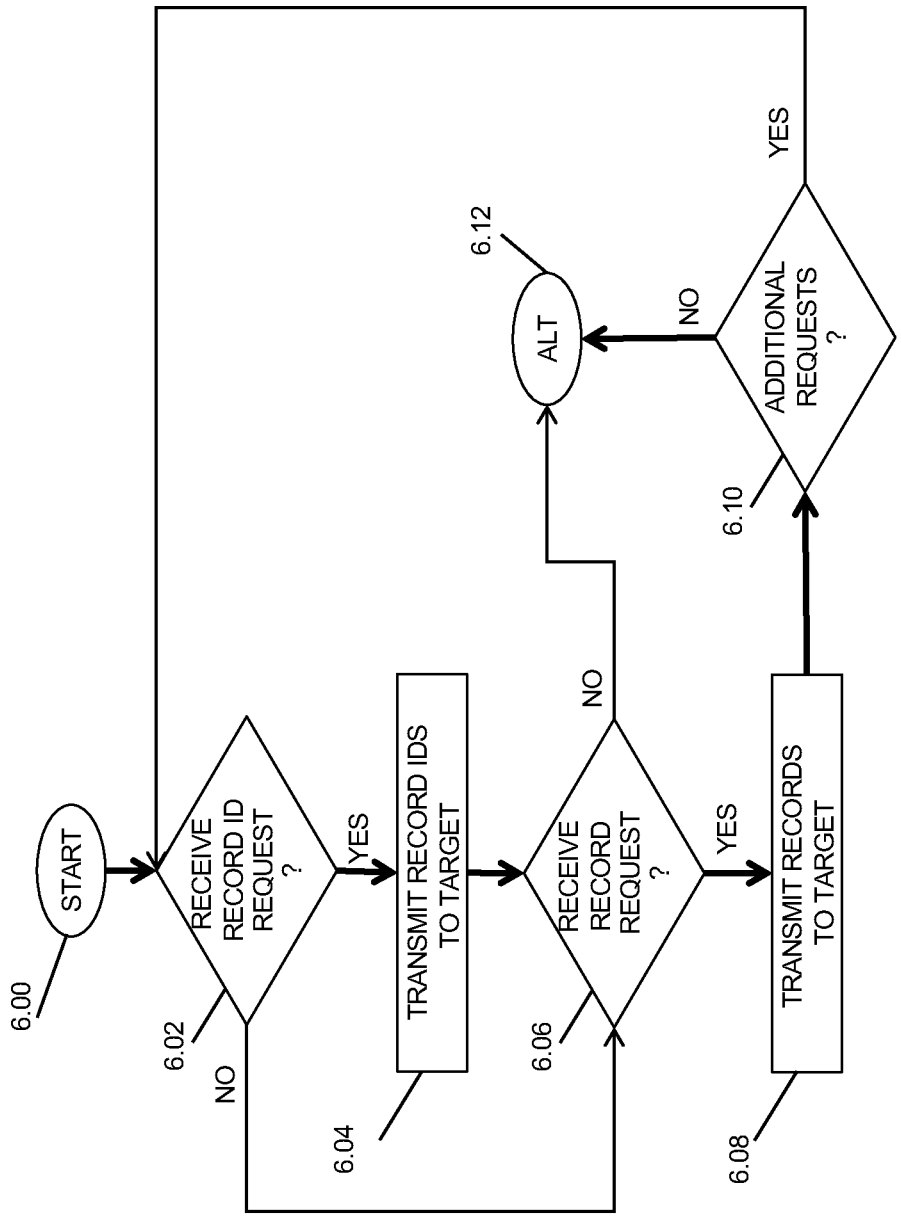
FIG. 6 is a flowchart of an aspect of the invented method whereby the source system is queried and accessed for record identifiers and records.

The exemplary source system software program SW.SRC is optionally adapted to enable the source server 104 to (a.) generate messages and communicate with the target system 102, (b.) process communicate with and process messages received from the target system 102, and (c.) manage the source DBMS 104A to perform, execute and instantiate all elements, aspects and steps as required of the source server 104 to practice the invented method in its various preferred embodiments particularly as outlined in the method of FIG. 6, and accompanying text, in conjunction with one or more of the components described in FIGS. 7A through 10C, including interactions with the target system 102.

Figure 4:
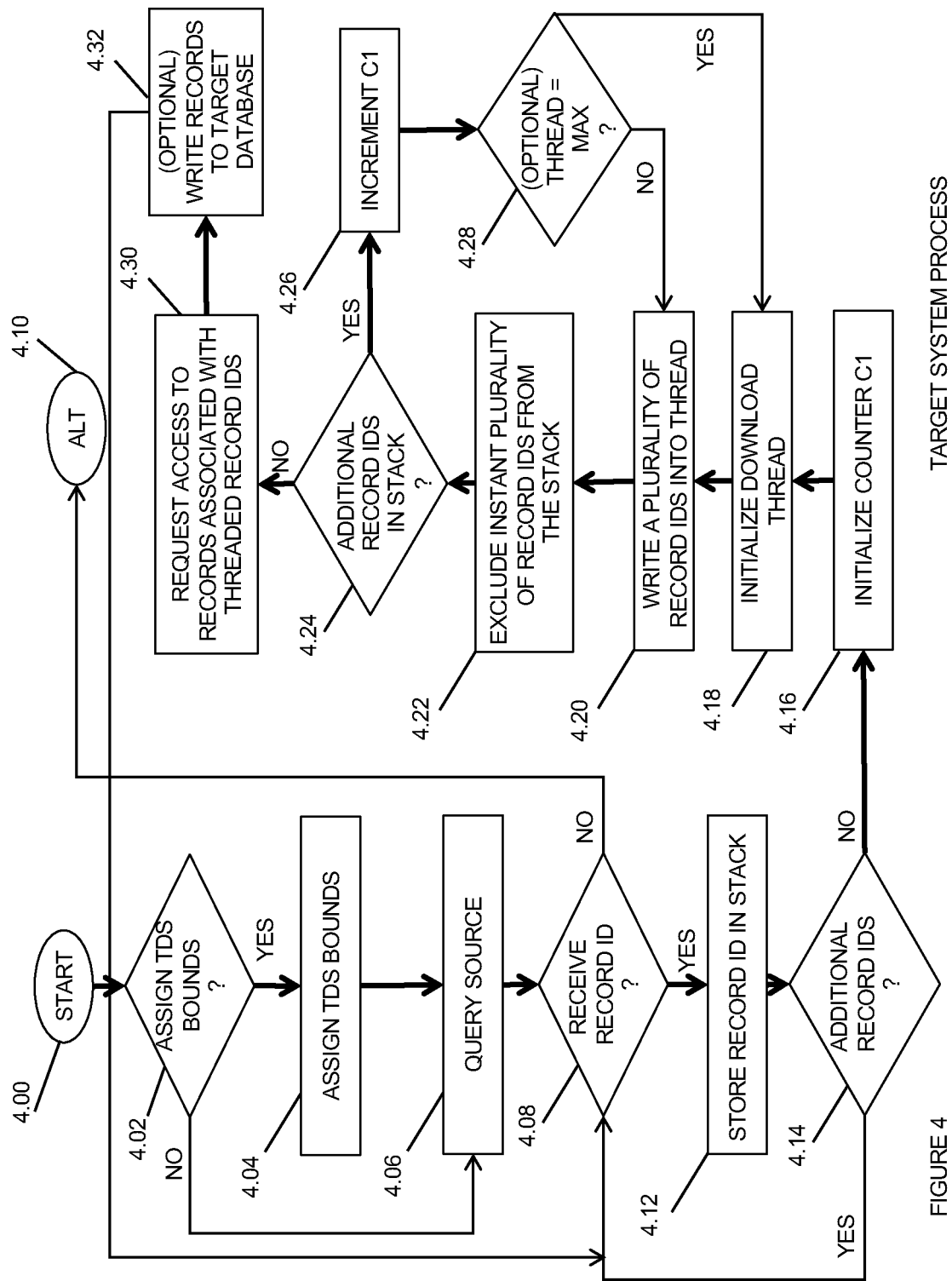
FIG. 4 is a flowchart of an aspect of the invented method whereby the target system accesses record identifiers, assigns the record identifiers to threads, and accesses software records.

Referring now generally to the Figures, and particularly to FIG. 4, FIG. 4 is a flowchart of an aspect of the invented method whereby the target system 102 accesses record identifiers REC.ID.001-REC.ID.N, assigns the record identifiers REC.ID.001-REC.ID.N to threads THREAD.001-THREAD.N, and accesses software records REC.001-REC.N. In step 4.02 the target system 102 determines whether to assign one or more time date stamp boundaries TDS.001-TDS.N to a query sent to the source system 104. When the target system 102 determines in step 4.02 to assign one or more time date stamp boundaries TDS.001-TDS.N to a query sent to the source system 104, the time date stamp boundaries TDS.001-TDS.N are assigned to the query in step 4.04. Alternatively, when the target system determines, in step 4.02, not to assign one or more time date stamp boundaries TDS.001-TDS.N to a query sent to the source system 104, the target system 102 proceeds to step 4.06, wherein the target system 102 transmits a query MSG.002 for software record identifiers REC.ID.001-REC.ID.N, optionally but not necessarily bound by the one or more time date stamp boundaries TDS.001-TDS.N assigned above, to the source system 104. In step 4.08 the target system 102 determines whether one or more record identifiers REC.ID.001-REC.ID.N have been received from the source system 104 by means of a record-identifier-containing message MSG.001. When the target system 102 determines in step 4.08 that one or more record identifiers REC.ID.001-REC.ID.N have not been received from the source system 104, the target system 102 proceeds to step 4.10, wherein alternate processes are executed.

In the alternative, when the target system 102 determines in step 4.08 that one or more record identifiers REC.ID.001-REC.ID.N have been received from the source system 104, the target system 102 stores the received record identifiers REC.ID.001-REC.ID.N in a one-dimensional stack STACK.001-STACK.N, or in a row RW.001-RW.N of a two-dimensional stack STACK2.001-STACK2.N in step 4.12. In step 4.14 the target system 102 determines whether additional record identifiers REC.ID.001-REC.ID.N are present which may be stored in the one-dimensional stack STACK.001-STACK.N. When the target system 102 determines in step 4.12 that additional record identifiers REC.ID.001-REC.ID.N are present or received from the source system 104, the target system 102 returns to step 4.08, and completes the loop of steps 4.08 through 4.12 until a positive determination is reached in step 4.12. When the target system 102 finds that no additional record identifiers REC.ID.001-REC.ID.N are present to be stored in the one-dimensional stack STACK.001-STACK.N, the target system proceeds to step 4.16. In step 4.16, a first counter C1 is initialized, for the purpose counting the number and/or volume of record identifiers REC.ID.001-REC.ID.N assigned to one or more download threads THREAD.001-THREAD.N. The maximum number of record identifiers REC.ID.001-REC.ID.N which may be assigned to the one or more download threads may optionally be determined by a previously designated thread count value Tcv.

In step 4.18 a download thread THREAD.001-THREAD.N is initialized by the target system 102. The initialization of the download thread THREAD.001-THREAD.N may be triggered by one or more occurrences within the target system 102, and may more particularly be triggered by the achievement of a previously designated plurality of record identifiers REC.ID.001-REC.ID.N are stored within the one-dimensional stack STACK.001-STACK.N. In step 4.20 a first plurality of record identifiers REC.ID.001-REC.ID.N are written into the download thread THREAD.001-THREAD.N; the first plurality of record identifiers REC.ID.001-REC.ID.N may optionally be written to the download thread THREAD.001-THREAD.N in a synchronous manner, or may optionally and preferably be written into the download thread THREAD.001-THREAD.N asynchronously. In step 4.22 the plurality of record identifiers REC.ID.001-REC.ID.N which have been written to the download thread THREAD.001-THREAD.N are excluded from the one-dimensional stack STACK.001-STACK.N, optionally and preferably by means of overwriting of memory locations within the target memory 102G of the target system 102. The target system 102 subsequently proceeds to step 4.24, wherein the target system 102 determines whether additional record identifiers REC.ID.001-REC.ID.N are present within the stack STACK.001-STACK.N which may be written to the instant download thread THREAD.001-THREAD.N. When the target system 102 determines in step 4.24 that additional record identifiers REC.ID.001-REC.ID.N are present within the stack STACK.001-STACK.N which may be written to the instant download thread THREAD.001-THREAD.N, the target system 102 proceeds to step 4.26, wherein the target system 102 increments the first counter C1. In optional step 4.28 the target system 102 optionally determines whether the instant thread THREAD.001-THREAD.N has reached a previously determined maximum number of record identifiers REC.ID.001-REC.ID.N. When the target system 102 determines in step 4.28 that instant thread THREAD.001-THREAD.N has reached a previously determined maximum number of record identifiers REC.ID.001-REC.ID.N, the target system 102 proceeds to step 4.18, wherein a new download thread THREAD.001-THREAD.N is initialized. Alternatively, when the target system 102 determines in step 4.28 that the instant download thread THREAD.001-THREAD.N has not reached a previously determined maximum number of record identifiers REC.ID.001-REC.ID.N, the target system 102 proceeds to step 4.20, and writes an additional plurality of record identifiers REC.ID.001-REC.ID.N into the download thread THREAD.001-THREAD.N.

In the alternative, when the target system 102 determines in step 4.24 that there are no additional record identifiers REC.ID.001-REC.ID.N in the one-dimensional stack STACK.001-STACK.N, the target system 102 requests access to the software records REC.001-REC.N associated with the record identifiers REC.ID.001-REC.ID.N in a designated download thread THREAD.001-THREAD.N in step 4.30. In optional step 4.32, the accessed records REC.001-REC.N associated with the record identifiers REC.ID.001-REC.ID.N in the designated download thread THREAD.001-THREAD.N are written into the target database 102I in the memory 102G of the target system 102. The target system 102 subsequently returns to step 4.08, wherein it is determined whether one or more record identifiers REC.ID.001-REC.ID.N have been received.

Figure 5:
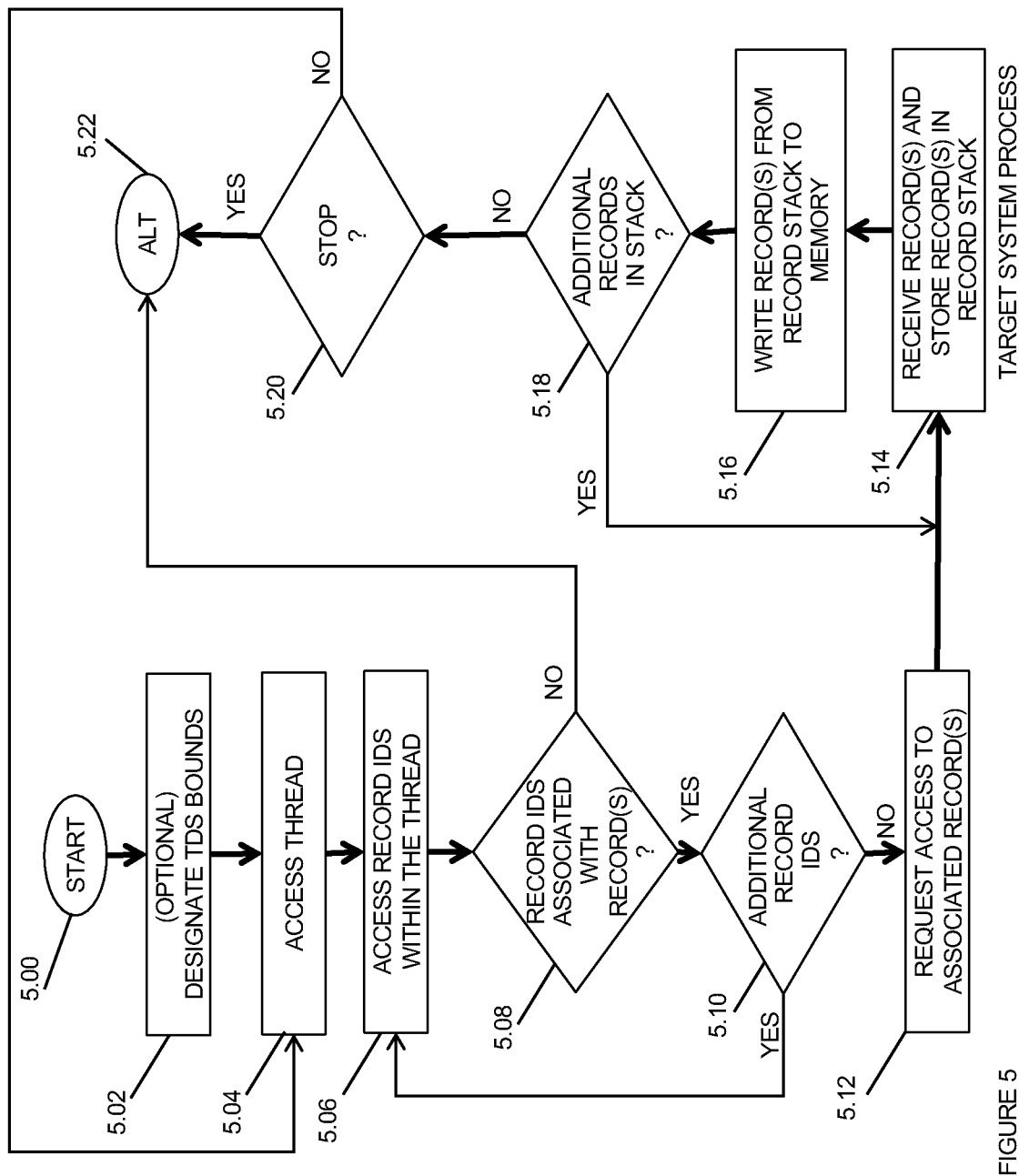
FIG. 5 is a flowchart of an aspect of the invented method whereby the target system accesses record identifiers from threads, accesses a plurality of software records associated with the record identifiers, and writes the records associated with the record identifiers into a record stack in the memory of the target computing system.

Referring now generally to the Figures, and particularly to FIG. 5, FIG. 5 is a flowchart of an aspect of the invented method whereby the target system 102 accesses record identifiers REC.ID.001-REC.ID.N from threads THREAD.001-THREAD.N, accesses a plurality of software records REC.001-REC.N associated with the record identifiers REC.ID.001-REC.ID.N, and writes the records REC.001-REC.N associated with the record identifiers REC.ID.001-REC.ID.N into a record stack REC.STACK.001-REC.STACK.N in the memory 102G of the target computing system 102.

In optional step 5.02 the target system 102 optionally assigns one or more time date stamp bounds TDS.001-TDS.N for the download thread THREAD.001-THREAD.N that the target system 102 will access. In step 5.04 the target system 102 accesses the desired thread THREAD.001-THREAD.N, and in step 5.06 the target system 102 accesses the record identifiers REC.ID.001-REC.ID.N within the desired thread THREAD.001-THREAD.N. In step 5.08 the target system 102 determines whether the record identifiers REC.ID.001-REC.ID.N accessed in step 5.06 are associated with software records REC.001-REC.N. When the target system 102 determines in step 5.08 that the record identifiers REC.ID.001-REC.ID.N accessed in step 5.06 are not associated with software records REC.001-REC.N, the target system 102 executes alternate operations in step 5.22. Alternatively, when the target system 102 determines in step 5.08 that the record identifiers REC.ID.001-REC.ID.N accessed in step 5.06 are associated with software records REC.001-REC.N, the target system 102 proceeds to step 5.10.

In step 5.10, the target system 102 determines whether additional record identifiers REC.ID.001-REC.ID.N remain to be accessed. When the target system 102 determines that additional record identifiers REC.ID.001-REC.ID.N remain to be accessed, the target system 102 proceeds to step 5.06, and accesses the additional record identifiers REC.ID.001-REC.ID.N. Alternatively, when the target system 102 determines that no additional record identifiers REC.ID.001-REC.ID.N are present to be accessed, the target system 102 proceeds to step 5.12, wherein the target system 102 requests access to the one or more software records REC.001-REC.N associated with the accessed record identifiers REC.ID.001-REC.ID.N. The target system 102 may preferably and optionally request the one or more software records REC.001-REC.N associated with the accessed record identifiers REC.ID.001-REC.ID.N from the source system across the network 100. In step 5.14, the target system 102 receives the one or more records REC.001-REC.N and stores the one or more records REC.001-REC.N in the record stack REC.STACK.001-REC.STACK.N. In step 5.16, the target system 102 writes the one or more records REC.001-REC.N to the memory 102G of the target computing system 102.

In step 5.18 the target system 102 determines whether additional software records REC.001-REC.N remain in the record stack REC.STACK.001-REC.STACK.N to be transferred to the memory 102G of the target system 102. When the target system 102 determines that additional software records REC.001-REC.N remain in the record stack REC.STACK.001-REC.STACK.N to be transferred to the memory 102G of the target computing system 102, the target system 102 proceeds to step 5.14, and executes the loop of steps 5.14 through 5.18 as necessary.

Alternatively, when the target system 102 determines in step 5.18 that no additional software records REC.001-REC.N remain in the record stack REC.STACK.001-REC.STACK.N to be transferred to the memory 102G of the target computing system 102, the target system 102 proceeds to step 5.20. In step 5.20 the target system 102 determines whether to terminate the process. When the target system 102 determines not to terminate the process, the target system 102 proceeds to step 5.04 and re-executes the loop of steps 5.04 through 5.20 until a positive determination is achieved in step 5.20. When the target system 102 determines in step 5.20 to terminate the process, the target system 102 executes alternate operations in step 5.22.

Referring now generally to the Figures, and particularly to FIG. 6, FIG. 6 is a flowchart of an aspect of the invented method whereby the source system 104 is queried and accessed for record identifiers REC.ID.001-REC.ID.N and software records REC.001-REC.N. In step 6.02 the source system 104 determines whether a request for record identifiers REC.ID.001-REC.ID.N has been received from the target system 102. When the source system 104 determines in step 6.02 that a request for record identifiers REC.ID.001-REC.ID.N has been received from the target system 102, the source system 104 transmits the record identifiers REC.ID.001-REC.ID.N to the target system 104 in step 6.04. Alternatively, when the source system 104 determines that no request for record identifiers REC.ID.001-REC.ID.N has been received from the target system 102, the source system 104 proceeds to step 6.06. In step 6.06, the source system 104 determines whether a request for software records REC.001-REC.N has been received from the target system 102. When the source system 104 determines in step 6.06 that a request has been received from the target system 102 for software records REC.001-REC.N, the source system 104 transmits the software records REC.001-REC.N to the target system 102 in step 6.08. When the source system 104 determines in step 6.06 that no request has been received from the target system 102 for software records REC.001-REC.N, the source system 104 executes alternate operations in step 6.12. In step 6.10 the source system 104 determines whether any outstanding or additional requests are present. When the source system 104 determines that there are outstanding and/or additional requests, the source system 104 re-executes the loop of 6.02 through 6.10. When the source system 104 determines that no outstanding or additional requests are present, however, the source system 104 executes alternate processes.

Figure 7B:
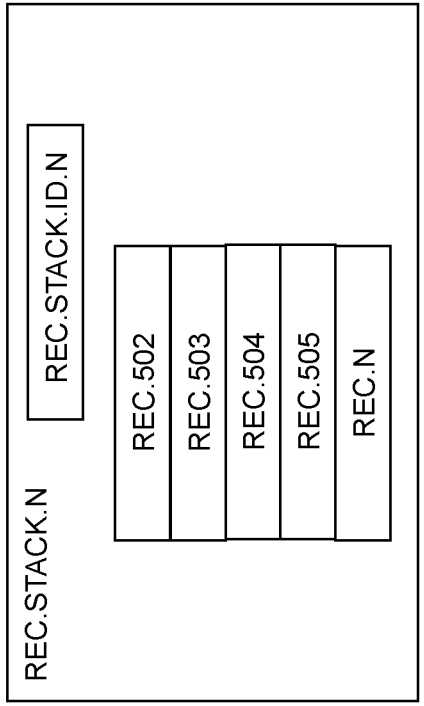
Figure 7D:
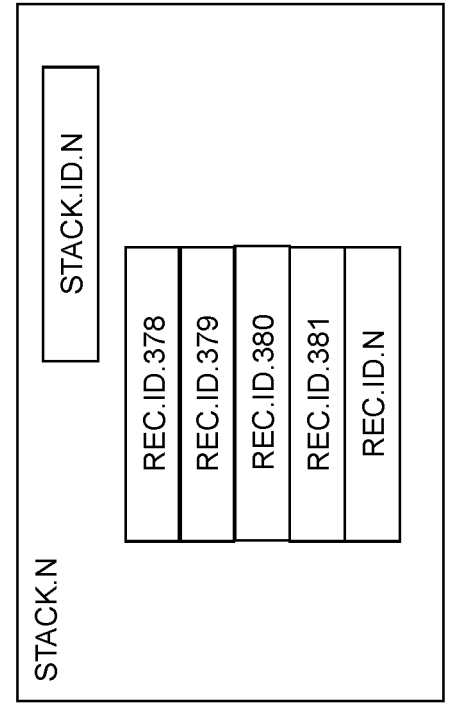
Figure 7A:
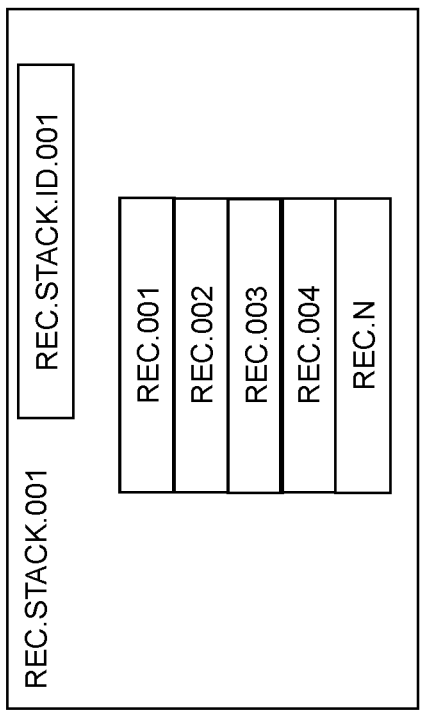
Figure 7C:
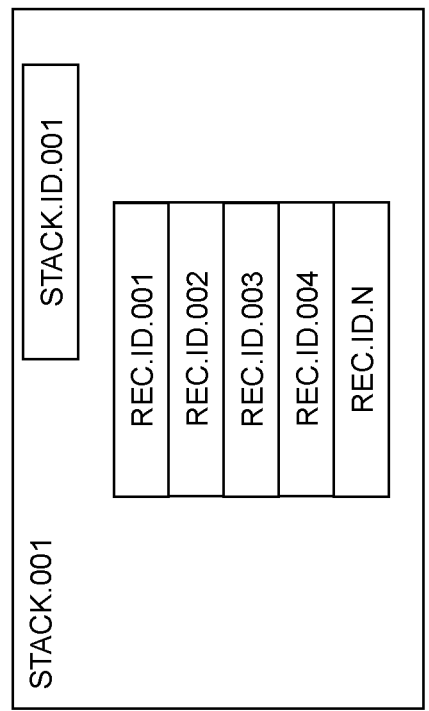
Figure 7E:
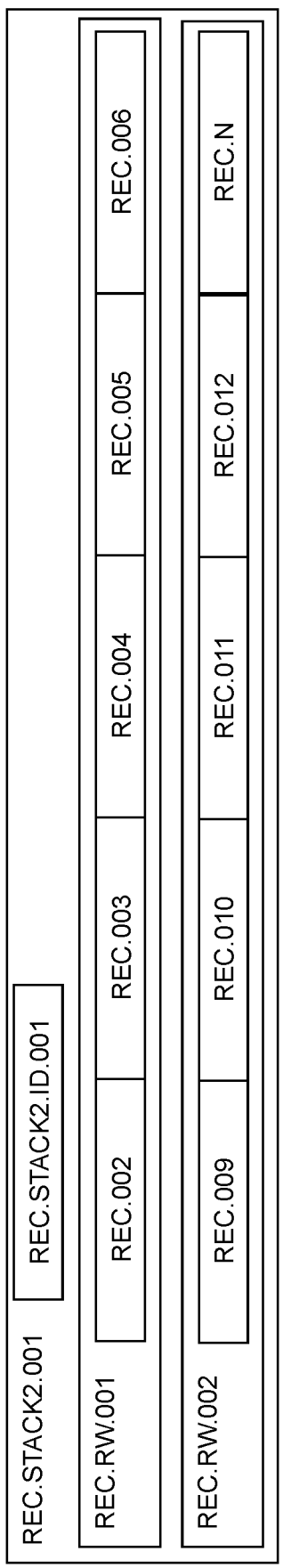

Referring now generally to the Figures, and particularly to FIG. 7A through FIG. 7D, FIG. 7A through FIG. 7D are block diagrams of a first through an Nth exemplary one-dimensional stack STACK.001-STACK.N. More particularly, FIG. 7A and FIG. 7B show a REC.STACK.001 and a REC.STACK.N, respectively, each containing an optional record stack identifier, REC.STACK.ID.001-REC.STACK.ID.N, and a first exemplary column of software records REC.001-REC.N, and a second exemplary column of software records REC.502-REC.N, respectively. FIGS. 7C and 7D show software record identifier stacks STACK.001 and STACK.N, respectively, each containing an optional stack identifier STACK.ID.001-STACK.ID.N, and a first column of software record identifiers REC.ID.001-REC.ID.N, and a second column of software record identifiers REC.ID.378-REC.ID.N, respectively.

Referring now generally to the Figures, and particularly to FIG. 7E through FIG. 7H, FIG. 7E through FIG. 7H are block diagrams of an exemplary first through Nth two-dimensional record stack REC.STACK2.001-REC.STACK2.N and an exemplary first through Nth two-dimensional stack STACK2-001-STACK2.N. The exemplary first two-dimensional record stack REC.STACK2.001 of FIG. 7E comprises an optional first two-dimensional record stack identifier REC.STACK2.ID.001, exemplary first and second record row REC.RW.001-REC.RW.002, and an exemplary first plurality of records REC.001-REC.005 contained within the first row REC.RW.001 of the exemplary first two-dimensional record stack REC.STACK2.001, and an additional plurality of records REC.006-REC.N contained within the second row REC.RW.003 of the exemplary first two-dimensional record stack REC.STACK2.001.

Figure 7F:
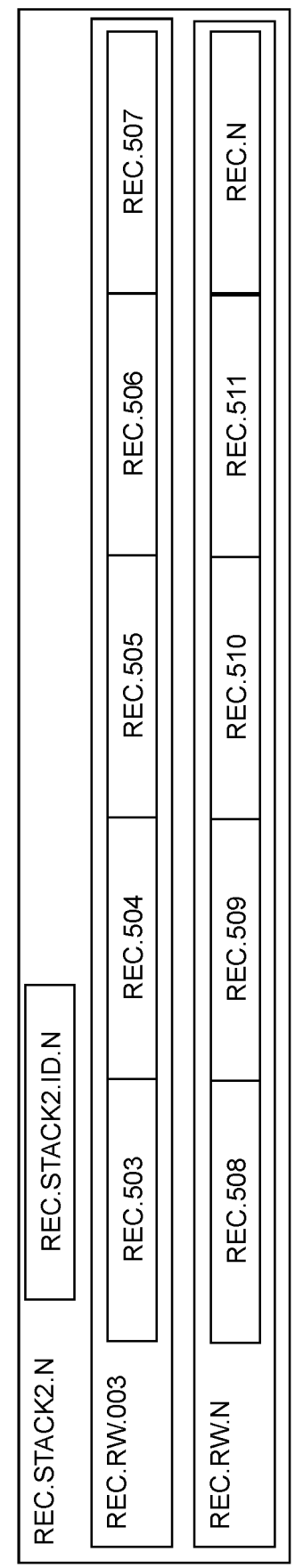
Figure 9A:
FIGS. 9A-9D are block diagrams of a first through an Nth exemplary thread.
Figure 9B:
Figure 9C:
Figure 9D:

The exemplary Nth two-dimensional record stack REC.STACK2.N of FIG. 7F comprises an optional Nth two-dimensional record stack identifier REC.STACK2.ID.N, exemplary third and Nth record row REC.RW.003-REC.RW.N, and an exemplary plurality of records REC.503-REC.507 contained within the third record row REC.RW.001, and an additional exemplary plurality of records REC.508-REC.N contained within the Nth record row REC.RW.N. It is understood that that the numerals assigned to exemplary software records REC.001-REC.N, and the number of shown software records REC.001-REC.N have been chosen for illustrative purposes only, and are not intended to act as a limitation upon the number or type of software record REC.001-REC.N which may be contained within the exemplary first and Nth two-dimensional record stacks REC.STACK2.001-REC.STACK2.N. It is additionally understood that the software records REC.001-REC.N stored within the record rows REC.RW.001-REC.RW.N of the two-dimensional record stacks REC.STACK2.001-REC.STACK2.N may, need not necessarily, have consecutive numeral assignments, but have been labeled with consecutive numerals in the Figures only to facilitate explanation and understanding.

The exemplary first two-dimensional stack STACK2.001 of FIG. 7G comprises an optional first two-dimensional stack identifier STACK2.ID.001, exemplary first and second rows RW.001-RW.2, and an exemplary plurality of record identifiers RECID.001-RECID.005 contained within the first row RW.001, and an additional exemplary plurality of record identifiers REC.ID.006-REC.ID.N contained within the first row RW.002. The exemplary Nth two-dimensional stack STACK2.N of FIG. 7H comprises an optional Nth two-dimensional stack identifier STACK2.ID.N, exemplary third and Nth row RW.003-RW.N, and a third exemplary plurality of record identifiers REC.ID.379-REC.ID.383 in the third row RW.003 of the Nth two-dimensional stack STACK2.N, and an Nth exemplary plurality of record identifiers REC.ID.384-REC.ID.N in the Nth row RW.N of the Nth two-dimensional stack STACK2.N. It is understood that that the numerals assigned to exemplary software records identifiers REC.ID.001-REC.ID.N, and the number of shown software records identifiers REC.ID.001-RECID.N have been chosen for illustrative purposes only, and are not intended to act as a limitation upon the number or type of software record REC.001-REC.N which may be contained within the exemplary first and Nth two-dimensional stacks STACK2.001-STACK2.N. It is additionally understood that the software record identifiers REC.ID.001-REC.ID.N stored within the rows RW.001-RW.N of the two-dimensional stacks STACK2.001-STACK2.N may, but need not necessarily, have consecutive numeral assignments, but have been labeled with consecutive numerals in the Figures only to facilitate explanation and understanding.

Referring now generally to the Figures, and particularly to FIG. 8A through FIG. 8D, FIG. 8A through FIG. 8D are block diagrams of a first through an Nth exemplary software record REC.001-REC.N. The first exemplary software record REC.001 contains a first record identifier RECID.001, a first time date stamp TDS.001, and a first plurality of record data DATA.001. The exemplary software records REC.002-REC.N contain, respectively, exemplary second through Nth record identifiers REC.002-REC.N, exemplary time date stamps TDS.002-TDS.N, and exemplary pluralities of record data DATA.002-DATA.N.

Referring now generally to the Figures, and particularly to FIG. 9A through FIG. 9D, FIG. 9A through FIG. 9D are block diagrams of a first through an Nth exemplary thread THREAD.001-THREAD.N. The first exemplary thread THREAD.001 contains a first thread identifier THREAD.ID.001, a first time date stamp datum TDS.DATA.001, and a plurality of software record identifiers REC.ID.001-REC.ID.N. The second through Nth exemplary threads THREAD.002-THREAD.N contain, respectively, a second through Nth thread identifier THREAD.ID.002-THREAD.ID.N, a second through Nth time date stamp datum TDS.DATA.002-TDS.DATA.N, and a plurality of software record identifiers REC.ID.001-REC.ID.N The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Figure 10A:
FIGS. 10A-10C are block diagrams of exemplary messages transmitted between the target system and the source system.

Referring now generally to the Figures, and particularly to FIG. 10A, FIG. 10A is a block diagram of an exemplary first record identifiers REC.ID.001-REC.ID.N containing message MSG.001 (hereinafter "first message MSG.001") transmitted from the source system 104 to the target system 102. The first message MSG.001 comprises: a first message identifier MSG.ID.002, by which the first message MSG.001 maybe recognized; a first message time date stamp MSG.TDS.002, indicating the time point at which the first message MSG.001 was transmitted from the source system 104; an address SRC.ADDR of the source system 104 as the sending address of the first message MSG.001; an address TGT.ADDR of the target system 102 as the receiving address of the first message MSG.001; and a plurality of record identifiers REC.ID.001-REC.ID.N.

Figure 10B:

Referring now generally to the Figures, and particularly to FIG. 10B, FIG. 10B is a block diagram of an exemplary second message MSG.002 (hereinafter "second message MSG.002") transmitted from the target system 102 to the source server 104. The second message MSG.002 comprises: a second message identifier MSG.ID.003, by which the second message MSG.002 may be recognized; a second message time date stamp MSG.TDS.003, indicating the time point at which the second message MSG.002 was transmitted from the target system 102; an address TGT.ADDR of the target system 102 as the sending address of the second message MSG.002; an address SRC.ADDR of the source server 104 as the receiving address of the second message MSG.002; and set of time date stamp boundaries TDS BOUNDS for a query to the source server 104.

Figure 10C:

Referring now generally to the Figures, and particularly to FIG. 10C, FIG. 10C is a block diagram of an exemplary third software record REC.001-REC.N containing message MSG.003 (hereinafter "third message MSG.003") transmitted from the source system 104 to the target system 102. The third message MSG.003 comprises: a third message identifier MSG.ID.002, by which the third message MSG.003 maybe recognized; a third message time date stamp MSG.TDS.002, indicating the time point at which the third message MSG.003 was transmitted from the source system 104; an address SRC.ADDR of the source system 104 as the sending address of the third message MSG.003; an address TGT.ADDR of the target system 102 as the receiving address of the third message MSG.003; and a plurality of software records REC.001-REC.N.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a non-transitory computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based herein. Accordingly, the disclosure of the embodiments of the invention is intended to be illustrative, but not limiting, of the scope of the invention, which is set forth in the following claims.

What is claimed is:
1. A computer-implemented method comprising:
  a. In a target system, accessing a plurality of record identifiers;
  b. Storing the plurality of record identifiers in an electronic memory ("memory") as elements of a software stack ("stack");
  c. Reading a first plurality of the plurality of record identifiers ("first plurality") from the stack and into a first thread, whereby the first plurality is thereupon excluded from the stack;

d. Applying the first thread to enable accessing each record associated with each record identifier of the first plurality; and e. Asynchronous writing of newly accessed additional record identifiers contemporaneously with sequentially writing of record identifiers from the stack into a plurality of threads, wherein each thread of the plurality of threads applies each received record identifier to enable accessing each record associated with each received record identifier.

2. The computer-implemented method of claim 1, wherein the stack is a one-dimensional stack.

3. The computer-implemented method of claim 1 wherein the stack comprises at least two dimensions and the first plurality is stored in the memory in a row of the stack.

4. The computer-implemented method of claim 1, further comprising requesting the first plurality from a first set of record identifiers associated with a plurality of records contained within a multiplicity of records.

5. The computer-implemented method of claim 1, further comprising requesting the plurality of record identifiers in accordance with a date-time range of record updates of the multiplicity of records.

6. The computer-implemented method of claim 1, further comprising the first thread operating to read at least one accessed record associated with the first plurality.

7. The computer-implemented method of claim 6, further comprising the first thread operating to write the least one accessed record associated with the first plurality into a database.

8. The computer-implemented method of claim 6, further comprising the first thread operating to write the at least one accessed record associated with the first plurality into a one dimensional array.

9. The computer-implemented method of claim 8, further comprising writing the at least one accessed record from the one dimensional array into a database.

10. The computer-implemented method of claim 1, wherein the count of record identifiers of the first plurality is a pre-established value.

11. The computer-implemented method of claim 1, further comprising writing a plurality of records associated with record identifiers of the first plurality into a local database.

12. The computer-implemented method of claim 1, wherein a maximum count of record identifiers of the first plurality is a pre-established value.

13. The computer-implemented method of claim 1, wherein the first plurality of record identifiers is written into the first thread when a preset count of record identifiers stored within the stack achieves a pre-established value.

14. The computer-implemented method of claim 13, wherein a maximum count of record identifiers written into each thread of the plurality of threads is at least partially derived from a thread count value.

15. The computer-implemented method of claim 1, wherein the first plurality is excluded from the stack after the first plurality is written into the first thread.

16. A system including a device bi-directionally communicatively coupled with an electronic communications network ("network"), the device comprising:

a central processing unit ("CPU") bi-directionally communicatively coupled with a network interface, the network interface bi-directionally communicatively coupling the device with the network; and a memory bi-directionally communicatively coupled with the CPU, and the memory containing instructions that operatively direct the system to:

a. access a plurality of record identifiers;

b. store the plurality of record identifiers in the memory as elements of a two dimensional software stack ("stack");

c. read a first plurality of the plurality of record identifiers ("first plurality") from the stack and into a first thread, whereby the first plurality is thereupon excluded from the stack;

d. apply the first thread to enable accessing each record associated with each record identifier of the first plurality; and e. asynchronously write newly accessed additional record identifiers contemporaneously with sequentially writing record identifiers from the stack into a plurality of threads, wherein each thread of the plurality of threads applies each received record identifier to enable accessing each record associated with each received record identifier.

17. The system of claim 16 further comprising means to read at least one accessed record associated with the first plurality.

18. The system of claim 17, further comprising means to write the least one accessed record associated with the first plurality into a database.

19. The system of claim 17, further comprising means to write the least one accessed record associated with the first plurality into a into a one dimensional array.

20. The system of claim 19, further comprising writing the least one accessed record from the one dimensional array into a database.

21. The system of claim 16, wherein the stack is a one-dimensional stack.

22. The system of claim 16, wherein the stack comprises at least two dimensions and the first plurality is stored in a row of the stack.

* * * * *